United States Patent
Ben Yochanan (10) Patent No.: US 10,677,826 B2
(45) Date of Patent: Jun. 9, 2020

(54) DEVICE, SYSTEM, AND METHOD OF PROTECTING UTILITY METERS AND INFRASTRUCTURE

(71) Applicant: ARM LIMITED, Cambridge (GB)

(72) Inventor: Noam Ben Yochanan, Petach Tikva (IL)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/005,696

(22) Filed: Jun. 12, 2018

(65) Prior Publication Data

US 2019/0377015 A1    Dec. 12, 2019

(51) Int. Cl.
*G01R 22/06* (2006.01)
*G01D 4/00* (2006.01)

(52) U.S. Cl.
CPC .......... *G01R 22/066* (2013.01); *G01D 4/004* (2013.01); *G01D 4/008* (2013.01); *G01R 22/063* (2013.01)

(58) Field of Classification Search
CPC .......... G01D 4/004; Y02B 90/242; H02J 3/14
USPC .................................... 340/870.02
See application file for complete search history.

(56) References Cited

U.S. PATENT DOCUMENTS

| 6,100,817 | A * | 8/2000 | Mason, Jr. | G01D 4/004 340/870.02 |
| 2006/0071812 | A1* | 4/2006 | Mason, Jr. | G01D 4/004 340/870.02 |
| 2011/0184586 | A1 | 7/2011 | Asano | |
| 2011/0258022 | A1* | 10/2011 | Forbes, Jr. | G01D 4/004 705/7.39 |
| 2012/0092177 | A1 | 4/2012 | Kuystermans | |
| 2012/0098518 | A1 | 4/2012 | Unagami | |
| 2012/0137126 | A1* | 5/2012 | Matsuoka | H04L 9/0838 713/156 |
| 2016/0112378 | A1* | 4/2016 | Bernheim | H04L 9/0827 380/255 |

FOREIGN PATENT DOCUMENTS

EP    2566125 A1    3/2013

OTHER PUBLICATIONS

International Search Report (ISR) in PCT/GB2019/051272, dated Jul. 3, 2019.
Written Opinion of the International Searching Authority in PCT/GB2019/051272, dated Jul. 3, 2019.

\* cited by examiner

*Primary Examiner* — Fabricio R Murillo Garcia
(74) *Attorney, Agent, or Firm* — Eitan Mehulal Sadot (57) ABSTRACT

Device, system, and method of protecting utility meters and utility infrastructure; and particularly, for determining whether an electricity meter or associated electricity wires have been tampered with or have been physically switched or manipulated. An electricity meter includes a challenge transmitter to transmit a challenge message, via a wired electric cable, to a consumer-side responder that is located within a venue which receives electric power via the electricity meter. The electricity meter further includes a response receiver to receive a response message from the consumer-side responder via the wired electric cable, and to check the response message for correctness based on a shared secret that is known only to the electricity meter and to the consumer-side responder.

20 Claims, 5 Drawing Sheets

DEVICE, SYSTEM, AND METHOD OF PROTECTING UTILITY METERS AND INFRASTRUCTURE

FIELD

Some embodiments relate to the field of utility meters.

BACKGROUND

An electricity meter (or an electric meter) is a device that measures the amount of electric energy that is consumed, for example, by a residence, by a business, or by a particular electrically-powered system.

For example, an electric utility company generates electric energy, and then distributes and sells it to customers. The electric utility company installs an electricity meter at the customer's premises (e.g., home, office, enterprise, or the like), to monitor the electric energy consumed by the customers. The electricity meter is read, for example, once per billing period (e.g., once per month); and the electricity consumption data is then used by the electric utility company for billing purposes.

DETAILED DESCRIPTION

The Applicants have realized that fraud may be committed by physically switching utility meters, and/or their input lines and/or their output lines, across two neighboring apartments or venues or premises. Accordingly, some embodiments may provide a smart and fraud-reducing metering system and infrastructure, in which a particular meter is configured to measure electric consumption of only a particular venue, and their coupling is authenticated (e.g., periodically) via a dedicated challenge-and-response mechanism that ensures that the particular meter is indeed still monitoring the consumption of electricity by that particular venue.

Some embodiments provide devices, systems, and methods of protecting utility meters and infrastructure; and particularly, for determining whether an electricity meter or associated electricity wires have been tampered with or have been physically switched or manipulated (or are malfunctioning). For example, an electricity meter includes a challenge transmitter to transmit a challenge message, via a wired electric cable, to a consumer-side responder that is located within a venue which receives electric power via the electricity meter. The electricity meter further includes a response receiver, to receive a response message from the consumer-side responder via the wired electric cable, and to check the response message for correctness based on a shared secret that is known only to the electricity meter and to the consumer-side responder.

Figure 1A:
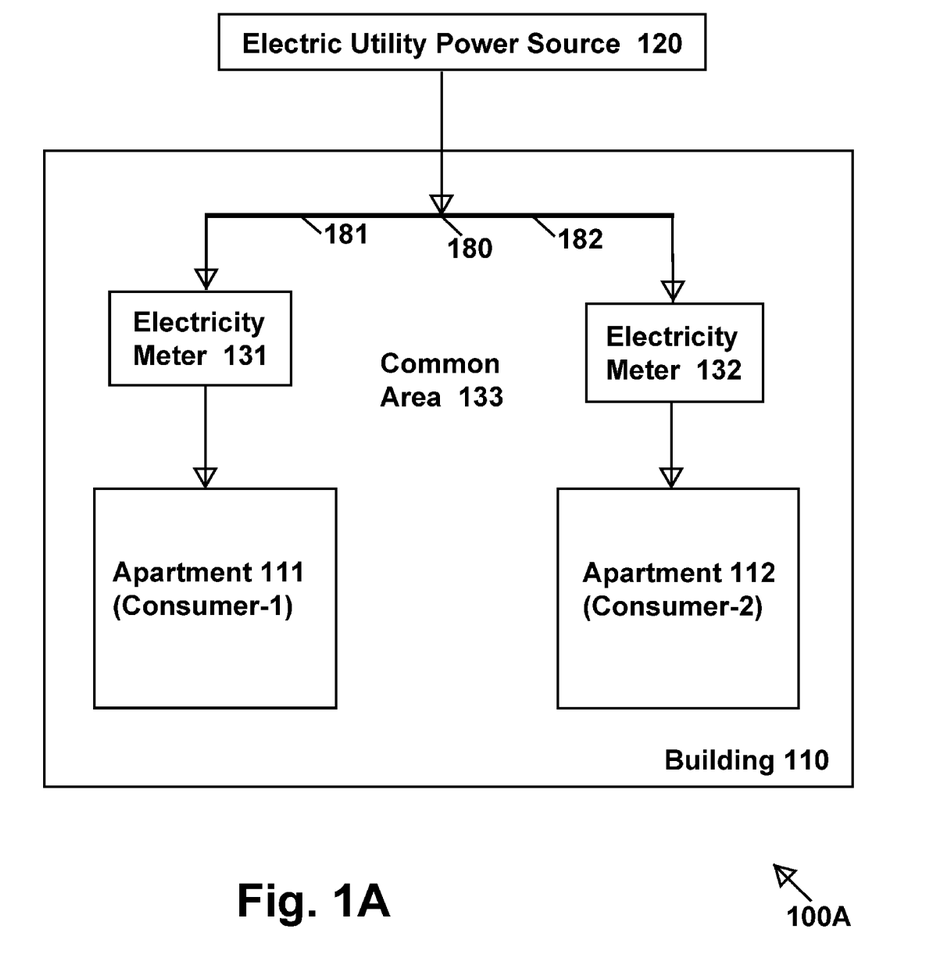
FIG. 1A is a schematic illustration of a conventional system of multiple consuming entities associated with multiple electricity meters.

Reference is made to FIG. 1A, which is a schematic illustration of a conventional system 100A of multiple consumers associated with multiple electricity meters. For example, an apartment building 110 comprises multiple apartments, such as Apartment 111 of Consumer-1 and Apartment 112 of Consumer-2. Electricity is provided to building 110 from an electric utility power source 120 (e.g., operated by an electric utility company). At or in proximity to an entry node 180 to (or of) the building 110, the provided electricity is distributed to two paths or branches: a first branch 181 provides the electricity to Apartment 111, and a second branch 182 provides the electricity to Apartment 112.

Along the first branch 181, a first electricity meter 131 is installed and connected, to measure the electricity that is provided to (and consumed by) Apartment 111. Similarly, along the second branch 182, a second electricity meter 132 is installed and connected, to measure the electricity that is provided to (and consumed by) Apartment 112. In some implementations, electricity meter 131 is located externally to Apartment 111; and electricity meter 132 is located externally to Apartment 112; for example, electricity meters 131 and 132 may be co-located next to each other in a common area 133, such as a yard, a staircase, a utility cabinet or utility room of the building, or the like.

In a demonstrative implementation, Apartment 111 is utilized by Consumer-1 who is a high-consuming entity; for example, he continuously and extensively utilizes his water heater, and/or he utilizes computing devices that performs crypto-currency mining operations. In contrast, Apartment 112 is utilized by Consumer-2 who is a low-consuming entity; for example, he is out of his apartment most of the day, and he utilizes only his television and lamps at night for several hours.

The Applicants have realized that each one of the electricity meters 131-132, only measures the electricity that runs or travels through itself, while being oblivious to the identity or the characteristics of the entity that actually receives the electricity through such meter, and without being able to autonomously ascertain or know which venue actually receives or consumes the measured electricity. The Applicants have realized that a conventional electricity meter (131, 132), which was installed and intended to measure the electricity provided to a first venue, is not capable of detecting and/or reporting that it has been re-located or re-wired or otherwise manipulated to actually monitor the electric consumption of a second, different, venue.

The Applicants have realized that a conventional installment, such as system 100 of FIG. 1A, is exposed to fraudulent re-wiring, fraudulent physical switching of meters, and/or other manipulation(s) that would cause a particular electric meter, that was originally installed to measure the electricity provided to a first venue, to actually measure electricity that is provided through the meter to a second, different, venue. The Applicants have also realized that such problems or exposure may exist with regard to various types of electricity meters, including those that have to be read manually by a human inspector of the electric company, as well as those that are implemented as a "smart meter" or as a meter that is able to autonomously report its current reading to a remote location (e.g., via a wired communication link and/or a wireless communication link).

Figure 1B:
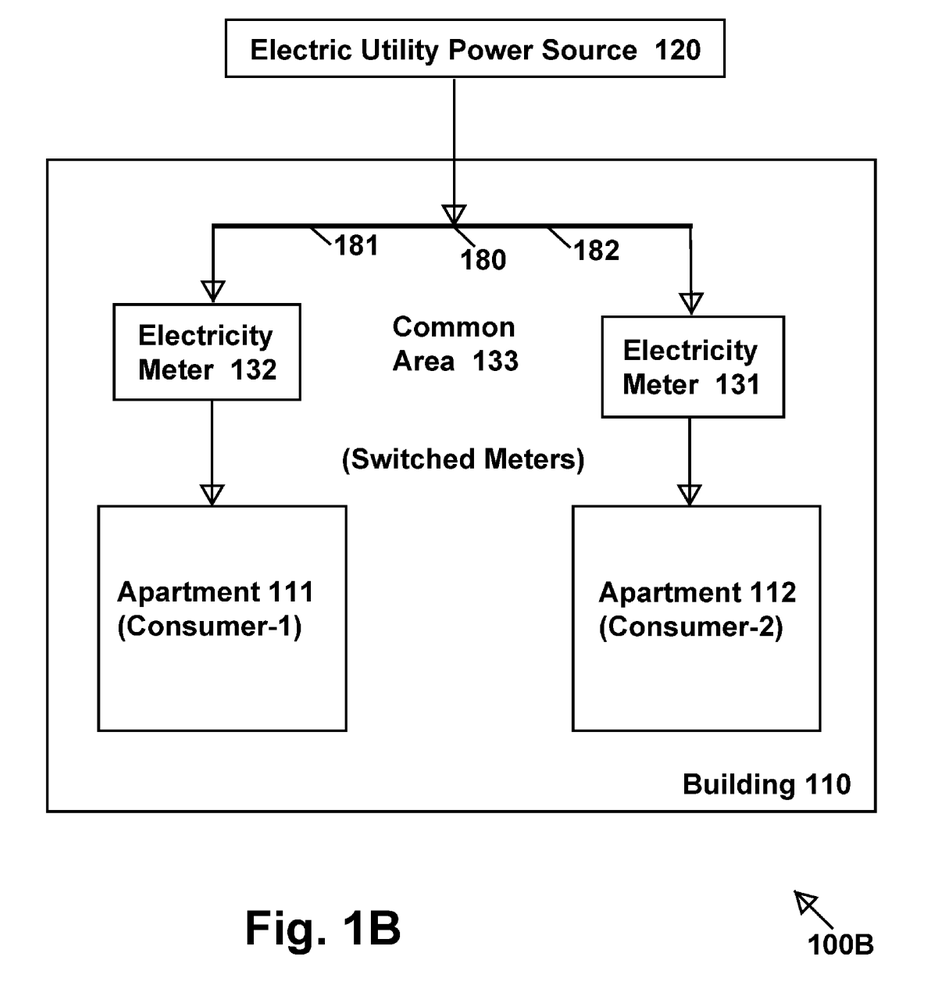
FIG. 1B is a schematic illustration of a first type of fraudulent or tampered installation, which may be detected by some embodiments.

Reference is made to FIG. 1B, which is a schematic illustration of a first type of fraudulent installation 100B, which may be detected by some embodiments. Consumer-1, who is the high-consuming entity, fraudulently accesses the two electricity meters 131-132 and physically switches between them; such as, by disconnecting electricity meter 131 from its input and output nodes, and disconnecting electricity meter 132 from its input and output nodes, then switching physically between the two electricity meters 131-132, and connecting electricity meter 131 to the input node and output node that used to be of electricity meter 132, and connecting electricity meter 132 to the input node and output node that used to be of electricity meter 131.

As a result, electricity meter 131 now measures the electricity consumption of Apartment 112 (instead of Apartment 111); and similarly, electricity meter 132 now measures the electricity consumption of Apartment 111 (instead of Apartment 112). Accordingly, Consumer-1 who is the high-consuming entity that utilizes Apartment 111, would be billed according to the low consumption that is measured by electric meter 131 which is now measuring the electric consumption of Apartment 112. Similarly, Consumer-2 who is the low-consuming entity that utilizes Apartment 112, would be billed according to the high consumption that is measured by electric meter 132 which is now measuring the electric consumption of Apartment 111. As a result, Consumer-1 pays the lower electric bill that actually reflects the low electric consumption of Consumer-2; whereas Consumer-2 pays the higher electric bill that actually reflects the high electric consumption of Consumer-1.

Figure 1C:
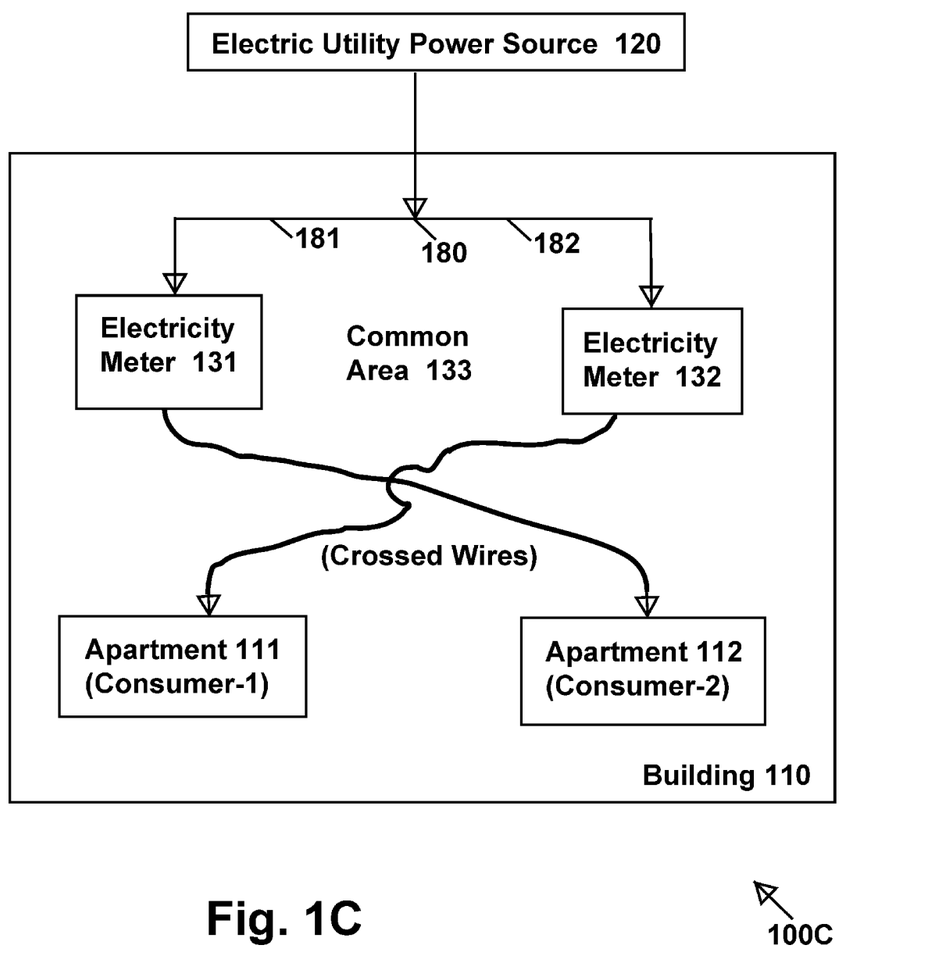
FIG. 1C a schematic illustration of a second type of fraudulent or tampered installation, which may be detected by some embodiments.

Reference is made to FIG. 1C, which is a schematic illustration of a second type of fraudulent installation 100C, which may be detected by some embodiments. Consumer-1, who is the high-consuming entity, approaches the conventional system 100 and physically switches the two exit nodes of the two electricity meters 131-132; such that electricity meter 131 remains in its original location but is now fraudulently wired to measure the power provided to (and consumed by) Apartment 112 instead of Apartment 111; and such that, similarly, electricity meter 132 remains in its original location but is now fraudulently wired to measure the power provided to (and consumed by) Apartment 111 instead of Apartment 112.

Accordingly, Consumer-1 who is the high-consuming entity that utilizes Apartment 111, would be billed according to the low consumption that is measured by electric meter 131 which is now measuring the electric consumption of Apartment 112. Similarly, Consumer-2 who is the low-consuming entity that utilizes Apartment 112, would be billed according to the high consumption that is measured by electric meter 132 which is now measuring the electric consumption of Apartment 111.

Some embodiments operate to ensure that once an electricity meter is installed and wired to measure the electricity provided to (or consumed by) a particular venue (e.g., a particular apartment, a particular house, a particular office, or the like), such electricity meter cannot be switched or re-located or re-wired or otherwise manipulated to measure electricity that is provided to (or is consumed by) another, different, venue. Some embodiments may thus detect, prevent and/or reduce fraudulent physical re-wiring or physical switching of electricity meters, and/or of their respective input lines, output lines, input sockets, output sockets, incoming wires or cables, outgoing wires or cables, or other related equipment.

Figure 2:
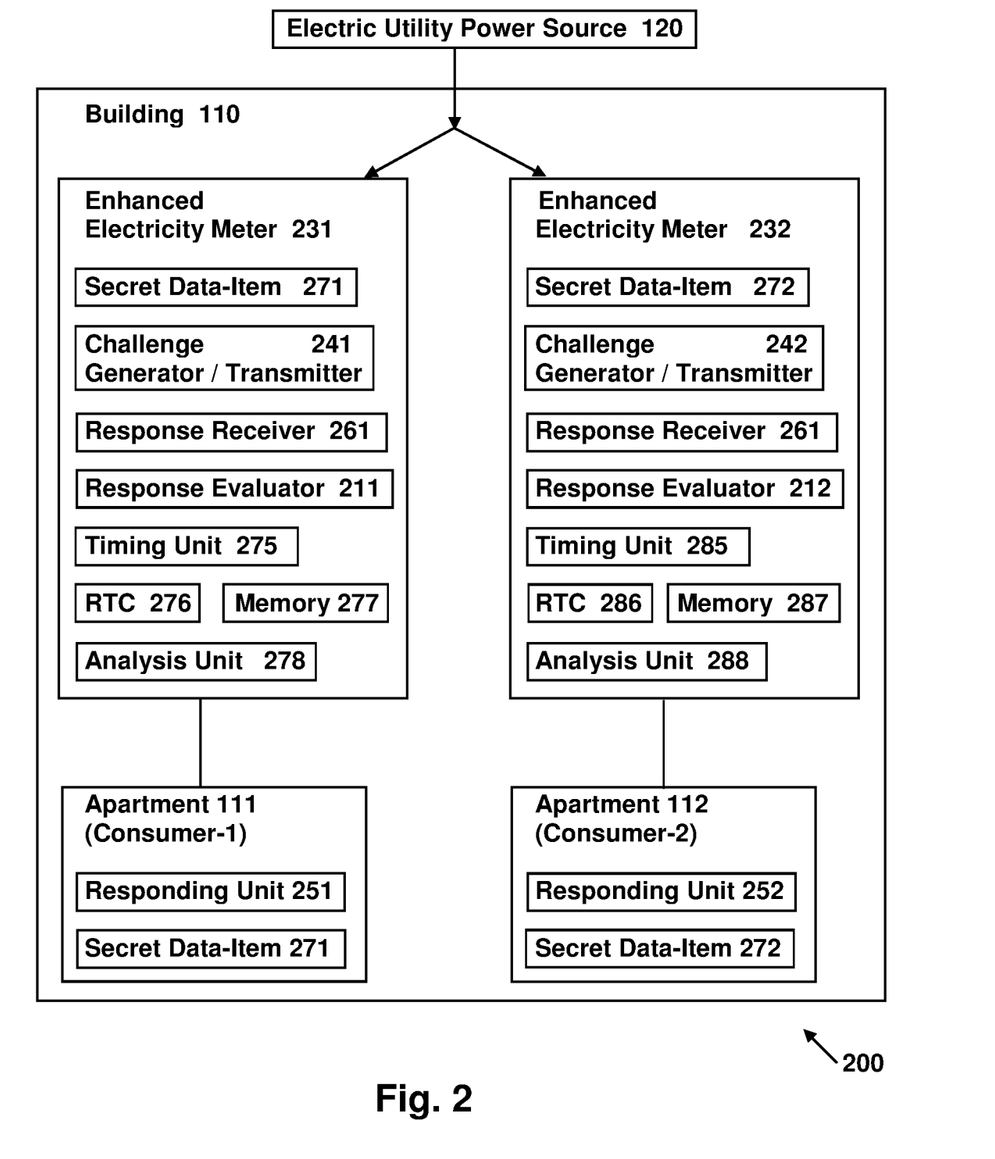
FIG. 2 is a schematic illustration of a system, in accordance with some demonstrative embodiments.

Reference is made to FIG. 2, which is a schematic illustration of a system 200, in accordance with some demonstrative embodiments. For example, apartment building 110 comprises multiple apartments, such as Apartment 111 of Consumer-1 and Apartment 112 of Consumer-2. Electricity is provided to building 110 from an electric utility power source 120. At an entry node to the building 110, the provided electricity is distributed to two paths or branches: a first branch provides the electricity to Apartment 111, and a second branch provides the electricity to Apartment 112.

Instead of utilizing conventional electricity meters (e.g., meters 131-132 of FIG. 1A), system 200 comprises "smart" or improved or enhanced or consumer-aware electric meters, which may be able to detect whether they have been physically switched or re-located or re-wired or otherwise manipulated to measure the electricity consumption of a venue other than the original venue intended to be metered. For example, along the first branch, a first enhanced electricity meter 231 is installed and connected, to measure the electricity that is provided to (and consumed by) Apartment 111. Similarly, along the second branch, a second enhanced electricity meter 232 is installed and connected, to measure the electricity that is provided to (and consumed by) Apartment 112. In some implementations, the enhanced electricity meter 231 may be located externally to Apartment 111; and the enhanced electricity meter 232 may be located externally to Apartment 112; for example, the enhanced electricity meters 231 and 232 may be co-located next to each other in a common area 133, such as a yard, a staircase, a utility cabinet or utility room of the building, or the like.

System 200 may comprise and utilize a challenge-and-response mechanism, to ensure that each electricity meter indeed measures the electricity consumed by the venue that it was originally intended to measure, and not a different venue. For example, the enhanced electricity meter 231 may comprises a Challenge Generator/Transmitter 241; whereas a particular location or element within Apartment 111 may comprise a Responding Unit 251, for example, connected to the electric line(s) of Apartment 111 and/or integrated within a wall-based power outlet within Apartment 111 and/or integrated within (or as part of) an electric panel of Apartment 111 and/or otherwise installed (e.g., fixedly installed, non-removably) within Apartment 111.

Similarly, the enhanced electricity meter 232 may comprises a Challenge Generator/Transmitter 242; whereas a particular location or element within Apartment 112 may comprise a Responding Unit 252, for example, connected to the electric line(s) of Apartment 112 and/or integrated within a wall-based power outlet within Apartment 112 and/or integrated within (or as part of) an electric panel of Apartment 112 and/or otherwise installed (e.g., fixedly installed, non-removably) within Apartment 112.

The Challenge Generator/Transmitter 241 and the Responding Unit 251 associated therewith, may both be pre-configured to exclusively know (or to have direct access to) a pre-stored shared secret or confidential data-item, that is unknown to other electricity meter(s) and/or to other challenge generators and/or to other responding units. For example, Challenge Generator/Transmitter 241 of the enhanced electricity meter 231 may store a Secret Data-Item 271; and the Responding Unit 251 may also store the same Secret Data-Item 271.

Periodically, at pre-defined or fixed time intervals (e.g., once per minute, once per hour, once per day, or the like), and/or at random or pseudo-random time-points (e.g., to mitigate attacks that know or that estimate the fixed time interval), and/or at time intervals that are non-fixed and are determined using a pseudo-random mechanism, the Challenge Generator/Transmitter 241 sends a query message or signal to the Responding Unit 251, via the electricity line that connects these two units. In response to such query message or signal, the Responding Unit 251 sends back (e.g., immediately) a response message having or comprising the Secret Data-Item 271 (or a value derived therefrom); and such response message is received at the enhanced electricity meter 231, for example, at the Challenge Generator/Transmitter 241 or at a Response Receiver 261. The response message is checked against (or compared to) the locally-stored copy of the Secret Data-Item 271 that is stored in the enhanced electricity meter 231, or is otherwise evaluated for correctness or for authenticity by a Response Evaluator 211, based on the Secret Data-Item 271 that is stored in the enhanced electricity meter 231.

As long as the enhanced electricity meter 231 is indeed connected to Apartment 111 and particularly to the Responding Unit 251 within Apartment 111, then the Responding Unit 251 would send back to the Response Receiver 261 the correct Secret Data-Item 271 (or a value derive from it), that confirms and/or authenticates to the enhanced electricity meter 231 that it is still connected properly to Apartment 111.

In contrast, if the enhanced electricity meter 231 does not receive back the Secret Data-Item 271 (or a value derived therefrom) from the Responding Unit 251, at all or within a pre-defined time period (e.g., within 1 second of sending the query message, or within 3 seconds, or within 10 seconds, or within K milliseconds wherein K is a positive number), then the Response Evaluator 211 of the enhanced electricity meter 231 determines that it is not properly communicating with the intended consumer entity (namely, with Apartment 111), and that this may be due to fraud or physical manipulation of other fraudulent attack or physical tampering or due to malfunction. In such case, the enhanced electricity meter 231 may perform or may initiate one or more remedial actions or corrective actions or alert actions; for example, generating and/or sending an alert notification to the electric company; generating and/or sending an alert notification to the intended consumer (e.g., to the registered owner of Apartment 111 according to the records at the electric company); sounding an audible alarm; activating a visible alarm or a visual alarm (e.g., blinking red LEDs or lights, on the enhanced electric meter 231 itself and/or in proximity to it); and/or other actions which may even amount to suspension or stopping the output of electricity (e.g., immediately; or after a pre-defined grace period or notification period, such as 12 or 24 hours) from the tampered enhanced electricity meter 231 (e.g., until a human inspector from the electric company visits the premises for resolution).

Additionally or alternatively, the enhanced electricity meter 231 may optionally monitor and/or measure the amount of time that typically elapses since it sends out the Challenge message or query, until it receives back the correct response (the Secret Data-Item 271); and may further utilize this data of the elapsed time, as well as detected abnormalities or fluctuation in such data, in order to trigger further determinations or actions. For example, the enhanced electricity meter 231 may comprise (or may be associated with) a Timing Unit 275, which may optionally comprise or may be associated with a real-time clock (RTC) 276; which may measure said time-period that elapses from sending the query message until receiving the (correct) response from the Responding Unit 251. A local buffer or memory unit 277 of the enhanced electric meter 231 may store such data, for example, storing the date-stamp and time-stamp at which the sending operation occurred, storing the data-stamp and time-stamp at which the receiving operation occurred, and/or storing the time-length between these two time-points; and may further store an indication whether the received response was indeed the "correct" response (e.g., matching the locally-stored Secret Data-Item 271 that is stored in the enhanced electricity meter 231) or an "incorrect" response (e.g., not matching the Secret Data-Item 271; or, no response was received at all). An analysis unit 278 (e.g., a local processor or controller or Integrated Circuit (IC) or other unit) may optionally analyze the records stored in the memory unit 277, periodically (e.g., every hour, every day, every week, or the like) and/or upon demand (e.g., upon receiving an analysis-triggering signal from the electric company) and/or if one or more conditions hold true (e.g., if the electric consumed in the past T hours is more than a pre-defined threshold value, such as, more than 50 Kilowatt Hour); and the analysis results may be sent back to the electricity company, or may trigger one or more operations or actions or notifications. For example, the analysis unit 278 may analyze the stored records; may detect that in the past seven days, the correct response was indeed received every hour; but that in the past 24 hours, the correct response was received after approximately 20 to 25 milliseconds from sending the query message, whereas in the previous 6 days the correct response was received within approximately 2 to 3 milliseconds from sending the query message; this analysis insight may trigger a notification to the electric company, for example, suggesting that a further inspection may be required, or suggesting to inspect for possible tampering or fraud, or alternatively suggesting that perhaps the electricity providing line(s) may be defective and may require maintenance, or that the Responding Unit 251 itself may require maintenance.

In some implementations, the Secret Data-Item 271 that is stored within the enhanced electricity meter 231, is identical to the Secret Data-Item 271 that is stored within the Responding Unit 251; and each one of them may utilize a pre-set list of rules or headers or prefixes or suffixes or other signals in order to identify a query and/or a response. For example, the enhanced electricity meter 231 may pre-store the string "12345" as the Secret Data-Item 271; and may be configured to send the string "6789" as the Query Message; whereas, the Responding Unit 251 may pre-store the string "12345" as the same Secret Data-Item 271, and may be configured to send the string "12345" upon receiving a query message of "6789".

In other implementations, optionally, the Secret Data-Item 271 may be a non-fixed data item, and/or may be dynamically changed or dynamically generated; for example, in order to reduce side-channel attacks or replay attacks or other attacks against the system (e.g., in which an attacker listens one time to the sent response, and then performs physical tampering with the electricity wiring and re-plays the same response periodically). For example, both the Challenge Generator/Transmitter 241 and the Responding Unit 251 may be initially configured to store the same seed value as the Secret Data-Item 271; the query message that is sent by the Challenge Generator/Transmitter 241 may be fixed or non-changing, such as signaling the string "6789"; but the response may be dynamically changing or non-fixed, for example, the Responding Unit 251 may dynamically calculate the response based on the seed value and another parameter or function (e.g., a hashing operation on the seed value and the number of seconds that elapsed since Jan. 1, 2010); and the enhanced electricity meter 231, upon receiving the response from the Responding Unit 251, need not merely compare it to a fixed pre-stored secret item, but rather, may utilize its Response Evaluator 211 to dynamically compute the same calculation and then compare its own computed result to the received response, in order to determine whether the response is "correct" or "incorrect".

In still other implementations, optionally, the response to be computed and then returned by the Responding Unit 251, may be a dynamically-changing response that is based on a dynamically-changing non-fixed query message received from the enhanced electricity meter 231. For example, instead of sending a fixed query message (e.g., signaling the string "6789"), the enhanced electricity meter 231 may generate and send a non-fixed query message, such as, a string that begins with "6789" (to allow the Responding Unit 251 to identify that this is indeed a valid query message) and is followed by a six-digit representation of the current time (e.g., the string "154638", corresponding to local time of "15:46:38" in military time format). Upon receiving such query message, the Responding Unit 251 may detect that it is a valid query message (e.g., based on the prefix or header of "6789"); may extract from it the non-fixed or the changing component (e.g., the string "154638"); may perform or compute the required function or computation (e.g., a hashing operation; or even a set of pre-defined mathematical operations, such as, "multiple the number by three and take the right-most six digits of the product"); and may send back to the enhanced electricity meter 231 the non-fixed, computed, response; which the enhanced electricity meter 231 then checks via its Response Evaluator 211 for validity or correctness, by computing the same computation locally on its side.

Other suitable mechanisms may be used, for example, utilizing one or more fixed values as a shared secret-item and/or utilizing one or more dynamically-changing values (e.g., elapsed time) as secret data-item or as a parameter of a function that computes the secret data-item. It is noted that different enhanced electricity meters (231 and 232) may have different values of secret data-items (271 and 272, respectively); and/or may utilize different functions and/or different seed values in case the query message and/or the responses are dynamically computed or checked.

The above-mentioned discussion may apply similarly with regard to other venues; for example, Apartment 112 may be associated with an enhanced electricity meter 232, having its own Challenge Generator/Transmitter 242 which may periodically send its own query messages to a Responding Unit 252 installed in Apartment 112. Similarly, the enhanced electricity meter 232 may further comprise (or may be associated with) other components or modules or units that were discussed above, for example, a Response Evaluator 212, a Timing Unit 285, a real-time clock (RTC) 286, a memory unit 287, an analysis unit 288, and so forth.

In some embodiments, the location of the Challenge Generator 241 need not necessarily be within the enhanced electricity meter 231; but rather, may be in other suitable one-or-more locations; and, additionally or alternatively, more than one such Challenge Generator may be utilized in order to ensure that a single electricity meter is not tampered with. For example, such Challenge Generator/Transmitter 242 (and the circuitry or elements that are associated with it) may be installed along the power line that enters into the electricity meter, or that runs from the electricity meter to the Apartment; thereby allowing, for example, to pin-point a location of physical tampering or of physical re-wiring or of physical switching of wires or meters or equipment. In some implementations, each such Challenge Generator/Transmitter 242 may generate and send its own (e.g., unique) query message; may receive from the Responding Unit 251 a suitable response; and may process it locally (e.g., by comparing or matching or performing the required computations) to determine whether it is correct or incorrect; optionally, may update a local (or remote) logbook or database with regard to the query result; and may generate or command or initiate one or more notifications or other actions upon detection of an incorrect response or a delayed response or other abnormality.

In other implementations, optionally, the response that is received at the Challenge Generator/Transmitter 242 of the enhanced electricity meter 231, need not necessarily be processed and/or verified locally within (or at) the enhanced electricity meter 231. Rather, the enhanced electricity meter 231 may forward or transmit or relay the incoming response (and optionally also the challenge itself), in the uplink or upstream direction towards the Electric Utility Power Source 120; which in turn may perform the verification or validation process of the incoming response against the generated challenge, and may determine (externally and/or remotely from the enhanced electricity meter 231) whether a tampering event is suspected. In such implementations, the Secret Data-Item need not necessarily be stored in the enhanced electricity meter 231; but rather, may be stored instead at the Electric Utility Power Source 120 or at another relay unit or transformer or node along the way between the Electric Utility Power Source 120 and the enhanced security meter 231.

For demonstrative purposes, some portions of the discussion herein may relate to a system in which the enhanced electricity meter 231 and the responding unit 251 store the same Secret Data-Item 271, and/or to other symmetric implementations; however, other implementations, such as a-symmetric or non-symmetric implementations, may also be possible. For example, a cryptographic pair of private key and public key may be utilized, such that the enhanced electricity meter 231 stores and utilizes a cryptographic public key (e.g., to encrypt with it a particular data-item that is then transmitted over the power line to the Responding Unit 251), whereas the Responding Unit 251 stores and utilizes the corresponding cryptographic private key (e.g., to decrypt with it the received encrypted data-item, and to send it back unencrypted to the enhanced electricity meter 231). Other suitable implementations may be possible, in which a-symmetric cryptography or encryption is utilized between the enhanced electricity meter 251 and the Responding Unit 251.

Optionally, the Responding Unit 251 may also have metering capabilities (e.g., independently of the enhanced electricity meter 231 that is located externally to the metered venue or premises); and this metering capability may be utilized as part of the challenge-and-response mechanism. For example, the enhanced electricity meter 231 may generate a challenge, encrypted with the secret data-item, such that the challenge is a query of (for example) "what is the amount of power in Watts that was consumed by this venue from 2:34 PM until 2:57 PM today". The Responding Unit 251 determines or calculates the requested answer (e.g., the amount of power consumed during this particular time-slot), encrypts the response with the secret data-item, and sends it back to the enhanced electricity meter 231 for verification. Other suitable mechanisms may be used, utilizing other types of unique information that the Responding Unit 251 may have access to, or may be able to measure or determine.

Figure 3:
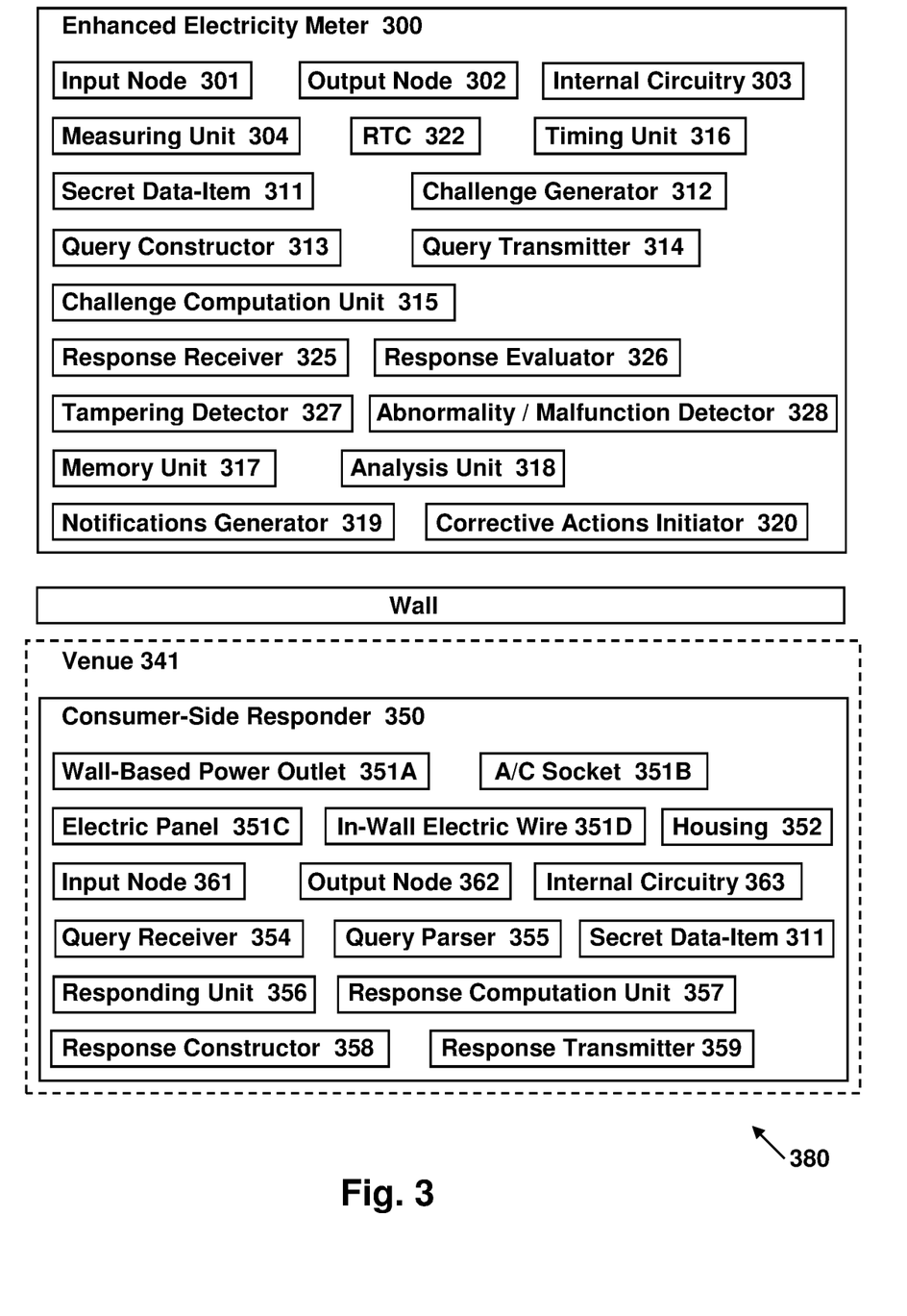
FIG. 3 is a schematic illustration of an enhanced electric meter associated with a consumer-side responder, in accordance with some demonstrative embodiments.

Reference is made to FIG. 3, which is a schematic illustration of a system 380 including an enhanced electric meter 300 associated with a Consumer-Side Responder 350, in accordance with some demonstrative embodiments. The enhanced electric meter 300 may be installed externally to the consumer's venue 341 (e.g., externally to the apartment or house or other premises of the consumer); whereas the Consumer-Side Responder 350 may be installed internally within the consumer's venue 341 (e.g., optionally implemented as part of a particular wall-base3d electric outlet socket in that venue).

The enhanced electric meter may comprise, for example: an input node 301 to receive incoming electricity from the electricity company; an output node 302 to output the outgoing electricity that is provided to the consuming entity; an internal circuitry 303 to transport the electricity within the electric meter 300; and a measuring unit 304 to measure the amount of electricity that is provided to (and consumed by) the consuming entity.

The enhanced electric meter 300 may further comprise one or more of: a unique Secret Data-Item 311 that is known only to the enhanced electric meter and to its corresponding Consumer-Side Responder 350, and that is utilized for authenticating the consuming entity; a Challenge Generator/Transmitter 312 which generates the query message, optionally comprising (or associated with) a Query Constructor 313 which constructs the query message (e.g., particularly when the query message is non-fixed but rather is formed dynamically per query, such as when a time-based response is required) and a Query Transmitter 314 which transmits the query message to the Responding Unit 350. Optionally, a Challenge Computation Unit 315 may be utilized to construct a non-fixed or a dynamically-constructed query message, based on a particular computation that utilizes the Secret Data-Item 311, in implementations that utilize such non-fixed query messages. A Timing Unit 316 associated with a real-time clock (RTC) 322 may keep track of the elapsed time for one or more purposes; for example, in order to trigger the periodic sending of the query message, and/or in order to measure the time-period that elapses from the sending of the query message until the receiving of the time-based response to it.

A response receiver 325 of the enhanced electricity meter 300 may receive the response message or response signal(s) from the Consumer-Side Responder 350. A response evaluator 326 may parse and/or analyze and/or process the received response, for example, by comparing it to the secret data-item 311 that is stored locally within the enhanced electricity meter 300, or by computing a derived value from the received response and then matching (or comparing) between that derived value and a value derived from the locally-stored secret data item. Based on the evaluation result of the received response, a Tampering Detector 327 may declare that no tampering or fraud is suspected, or conversely that it is suspected that tampering or fraud may exist.

A memory unit 317 of the enhanced electricity meter 300 (e.g., implemented using Read Only Memory (RAM), Flash memory, hard disk drive (HDD), solid state drive (SDD), or other storage unit or memory unit) may store data related to the challenges and/or the responses; for example, storing a copy of each sent challenge or query message, storing a copy of each received response, storing the time-stamp and date-stamp of each sending operation and/or each receiving operation, storing the time-difference between sending a query message and a respective receiving of the response message to it, storing an indication of whether the response is considered "correct" or "incorrect", storing other data (e.g., storing an average or a median value of the most-recent 50 measurements of time-periods between sending the query and receiving the response), storing indications of notification that were generated and sent or of remedial actions that were triggered or performed, and/or storing other data.

An analysis unit 318 or a processing unit of the enhanced electricity meter 300 (e.g., implemented using a processor, a processing core, a controller, an Integrated Circuit (IC), or the like) may perform one or more of the operations described above (e.g., to construct the query message, to check the correctness of the response, to calculate statistical properties of the sending/receiving operations and to detect abnormalities or irregularities, or the like).

An abnormality/malfunction detector 328 may analyze the stored data indicating past challenges and/or past responses and/or the time-length in between each pair of challenge-and-response; and may detect an abnormality or irregularity; for example, by detecting that a current or a fresh or a most-recent time-length for challenge-and-response, is at least N times greater (e.g., at least 1.5 or 2 or 3 or 5 or 10 times greater) than the average (or the median) time-length of the K previous challenge-and-response events (e.g., the average time-length of the previous 8 or 12 or 16 or 24 challenge-and-response events); thereby triggering a determination that a possible abnormality or malfunction may exist.

A Notifications Generator 319 of the enhanced electricity meter 300 (or associated therewith) may generate and/or send one or more notifications based on the above (e.g., a notification to the electric company and/or to the consumer upon detection of abnormality); and optionally, a Corrective Actions Initiator 320 may initiate or trigger or command the execution of other operations (e.g., sounding an audible alarm; displaying a visible alarm; generating and transmitting an alert message to the electric power company; summoning a human inspector to the premises; and even cutting-off power supply if one or more conditions hold true).

The Consumer-Side Responder 350 may be implemented, for example, as part of a wall-based power outlet 351A having an Alternate Current (A/C) socket 351B (or outlet), and/or may be mounted in or on a Housing 352 of such power outlet or electrical outlet or other unit, or may be fixedly attached to a power line or to an electric line within a wall of the relevant venue; or may be implemented as part of an in-house (or in-venue) Electric Panel 351C (e.g., a main panel, a sub-panel, a "master" panel, a "slave" panel, an in-house electricity switching unit, or the like); or may be part of (or attached to, or coupled to, or connected to) an In-Wall Electric Wire 351D that runs within a wall of the venue or within an internal wall of the venue. Optionally, the Consumer-Side Responder 350 may be In some implementations, a wall 340 of the venue 341 (e.g., the apartment, the house, the office, or the like) separates physically between the internal side of the venue (in which the Consumer-Side Responder 350 is located) and the external side of the venue (in which the electricity meter 300 is located). In some scenarios, the Consumer-Side Responder 350 may be internal to the venue 341, or may be integrated within the internal side or the venue-facing side of such wall 340, to ensure that the Consumer-Side Responder 350 cannot be physically accessed (or tampered with) from outside the venue 341 (e.g., by a neighbor, by an attacker, or by any third).

The Consumer-Side Responder 350 may optionally comprise, for example: an input node 361 that receives the incoming electricity that is provided by the electric company; optionally, an output node 362 which outputs such electricity (or, in some implementations, the Consumer-Side Responder 350 need not output any power, and may only operate as a dedicated responding unit or as a dedicated authenticity sensor or as a dedicated tampering sensor, which does not necessarily output power for consumption); and an internal circuitry 363 that runs power from its input node 361 to its output node 362.

The Consumer-Side Responder 350 may further comprise a Query Receiver 354, able to receive the query message that was sent by or from the enhanced electric meter 300 and/or able to inspect it and recognize that it is indeed a valid or well-formed query message; and optionally a Query Parser 355 able to parse such incoming query message, particularly if it is formed with dynamically-changing or non-fixed content (e.g., having a fixed header or fixed prefix, followed by a changing query payload) which may require extraction or other parsing. The Consumer-Side Responder 350 may store a copy of the same Secret Data-Item 311 that is also known only to the enhanced electric meter 300.

A responding unit 356 of the Consumer-Side Responder 350 may perform the actual responding operations to the query message; optionally utilizing one or more sub-units or modules, for example, a response computation unit 357 and/or a response constructor 358 able to compute and construct the response (e.g., particularly in implementations in which the Consumer-Side Responder 350 computes and constructs a non-fixed response to a non-fixed query message), and optionally utilizing a Response Transmitter 359 to perform the actual transmitting operation(s) once the response message is ready for conveying back to the enhanced electricity meter 300.

In some implementations, the Consumer-Side Responder 350 and/or components thereof, may be enclosed in or may be encapsulated in or may be protected by or sealed in a housing 352, for example, a no-tampering housing or other enclosure, or a tamper-free or tamper-proof housing or enclosure, or a tamper-evident housing or enclosure, which may make it more difficult to open and/or to access and/or to tamper with the components of the Consumer-Side Responder 350, and/or which makes it evident or visible that such tampering has been performed or has been attempted, and/or which generates and sends an alert or a notification to the electric power company if a tampering event occurs or is attempted.

It is noted that in some embodiments, the communication of the challenge or query from the electricity meter 300 to the Consumer-Side Responder 350, and/or the communication of the response from the Consumer-Side Responder 350 to the electricity meter 300, is performed on or via or within the power line itself, namely, on or via the physical wire through which electric current is supplied to the venue; and not through a wireless medium (e.g., not through Radio Frequency (RF) transmissions or Wi-Fi communications or other wireless medium); and not through a separate wired control channel or a separate wired back-channel. In contrast, a wireless authentication channel or a separate wired control channel (that is separate from the power line itself which provides the power for consumption), may defeat or may weaken one or some of the purposes of the system, or may expose the system to a replay attack or to a side-channel attack, or may expose the system to physical tampering or physical switching of wires of the power line which may not necessarily affect a wireless communication channel and/or a separate wired control channel. Accordingly, the particular implementation of the Consumer-Side Responder 350 as part of the power supply system, and/or as communicating with the electric meter via the power line itself that also provides the power for consumption by the venue, may provide additional security to the system and may assist in preventing or reducing fraud. In other implementations, optionally, a wireless communication channel may be utilized for exchanging the challenge and the response; for example, requiring the Consumer-Side Responder 350 to send a response that is based on (for example) a combination of a shared secret data-item and/or the current time and/or an amount of power that was consumed in a particular past time-slot, thereby allowing utilization of a wireless communication channel that cannot be easily defeated by a wireless response from another responding unit.

Although portions of the discussion herein may relate, for demonstrative purposes, to protection of an electric meter or of electrical infrastructure or to prevention of fraud with regard to electric power consumption, some embodiments may be utilized in conjunction with other types of utilities and/or services; for example, to detect fraud with regard to consumption of Internet services, communication services, telephone services, cable television services, and/or other suitable types of services; for example, by implementing a "metering device" or similar component or sensors or protector unit which sends (e.g., periodically) a challenge message towards a consumer-side responder, which then responds with a response message that enables the metering device to authenticate the consumer-side responder based on a shared secret that is known only to the metering device and the consumer-side responder. For example, some implementations may utilize a challenge-and-response mechanism, in which the response that is required in order to validate the consuming entity is based on a shared secret data-item and/or the current time and/or an amount of resource (e.g., water, gas, data-packets) that was consumed by the consuming entity during a particular past time-slot (optionally implemented via an additional or secondary metering unit or counter within the venue or premises).

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some implementations, an electricity meter comprises: a challenge transmitter to transmit a challenge message, via a wired electric cable, to a consumer-side responder that is located within a venue which receives electric power via said electricity meter; and a response receiver to receive a response message from said consumer-side responder via said wired electric cable, and to check said response message for correctness. For example, said response receiver is to check correctness of said response message based on a shared secret that is known only to said electricity meter and to said consumer-side responder. For example, said response receiver is to determine whether or not said response message matches a pre-defined shared secret that is known only to said electricity meter and to said consumer-side responder; wherein if said response message does not match said pre-defined shared secret, then the electricity meter is to generate a tampering notification. For example, if within a pre-defined time period from sending the challenge message, the response receiver does not receive from said consumer-side responder any response message, then the electricity meter is to generate a tampering notification or an abnormality notification.

In some implementations, the challenge message is a fixed challenge message that is sent at pre-defined time intervals, and that triggers said consumer-side responder to send back an authentic response message if said electricity meter or associated wires were not tampered with. For example, the challenge message comprises at least a non-fixed message-portion, which triggers said consumer-side responder to send back a response message having at least a non-fixed portion. For example, the electricity meter further comprises: a memory unit to store records of sent challenge messages and received response messages; an analysis unit to analyze said records, and to detect an abnormality that indicates tampering or malfunction. For example, said response receiver is to check correctness of said response message based on a-symmetric cryptography in which said consumer-side responder stores a cryptographic private key and said electricity meter stores a corresponding cryptographic public key.

In some implementations, an apparatus comprises: a responding unit to be located within a venue, wherein the venue receives electric power via an electricity meter that is located externally to the venue; wherein the responding unit is to receive from said electricity meter, via a wired electric cable, a challenge message; and to transmit to said electricity meter via said wired electric cable a response message. For example, said response message authenticates said responding unit to said electricity meter based on a shared secret that is exclusively known to said responding unit and said electricity meter. Optionally, said responding unit is part of an electric panel that is to be installed within said venue; or, said responding unit is part of a wall-based electric socket that is to be installed within said venue; or, said responding unit is to be part of an in-wall electrical wiring that runs within a wall of said venue.

For example, said response message authenticates said responding unit to said electricity meter based on a shared secret that is unknown to said electricity meter and is exclusively known to said responding unit and to a power-distributing device located upstream from said electricity meter. Optionally, said response message is constructed in said apparatus using a cryptographic private key, which corresponds to a cryptographic public key that was used by the electric meter to construct said challenge message.

In some implementations, a method comprises: sending a challenge message from an electricity meter located externally to a venue, towards a responding unit located within said venue, via a wired electric cable that provides electric power from said electric meter to said venue; receiving a response message from said responding unit; based on said response message, determining whether said electricity meter or associated electric wire have been tampered with. For example, if said response message does not match a pre-defined shared secret that is known only to said electric meter and to said responding unit, then determining that said electricity meter or associated electric wires have been tampered with. If no response message is received from said responding unit within a pre-defined time period of said sending, then determining that said electricity meter or associated electric wires have been tampered with.

For example, the method may comprise: storing information indicating time-lengths that elapsed from sending challenge messages to receiving respective response messages; determining that a particular time-length that elapsed between a particular sending operation and a particular respective receiving operation, is abnormal relative to other stored time-lengths; based on said determining, generating a notification of possible malfunction of said electricity meter or associated electric wires. Optionally, the determining comprises: determining that a particular time-length that elapsed between a particular sending operation and a particular respective receiving operation, is different by at least N percent relative to an average of a group of stored time-lengths, wherein N is a pre-defined value.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:
1. An electricity meter comprising:
a challenge transmitter to transmit a cable-switching detection challenge message, via a wired electric cable, to a consumer-side responder that is located within a consumer-side venue which receives electric power via said electricity meter, wherein said cable-switching detection challenge message is transmitted via said wired electric cable in a direction that is towards said consumer-side venue;
a response receiver to receive a cable-switching detection response message from said consumer-side responder located within said consumer-side venue via said wired electric cable, and to check said cable-switching detection response message for correctness, wherein said cable-switching detection response message is received in a direction that is incoming from said consumer-side venue;
wherein evaluation of said cable-switching detection challenge message and said cable-switching detection response message enables detection of cable switching between said electricity meter and said consumer-side venue.

2. The electricity meter of claim 1,
wherein said response receiver is to check correctness of said cable-switching detection response message based on a shared secret that is known only to said electricity meter and to said consumer-side responder.

3. The electricity meter of claim 1,
wherein said response receiver is to determine whether or not said cable-switching detection response message matches a pre-defined shared secret that is known only to said electricity meter and to said consumer-side responder;
wherein if said cable-switching detection response message does not match said pre-defined shared secret, then the electricity meter is to generate a tampering notification.

4. The electricity meter of claim 1,
wherein, if within a pre-defined time period from sending the cable-switching detection challenge message, the response receiver does not receive from said consumer-side responder any cable-switching detection response message, then the electricity meter is to generate a tampering notification or an abnormality notification.

5. The electricity meter of claim 1,
wherein the cable-switching detection challenge message is a fixed cable-switching detection challenge message that is sent at pre-defined time intervals, and that triggers said consumer-side responder to send back an authentic cable-switching detection response message if said electricity meter or associated wires were not tampered with.

6. The electricity meter of claim 1,
wherein the cable-switching detection challenge message comprises at least a non-fixed message-portion, which triggers said consumer-side responder to send back a cable-switching detection response message having at least a non-fixed portion.

7. The electricity meter of claim 1, further comprising:
a memory unit to store records of sent cable-switching detection challenge messages and received cable-switching detection response messages;
an analysis unit to analyze said records, and to detect an abnormality that indicates tampering or malfunction.

8. The electricity meter of claim 1,
wherein said response receiver is to check correctness of said cable-switching detection response message based on a-symmetric cryptography in which said consumer-side responder stores a cryptographic private key and said electricity meter stores a corresponding cryptographic public key.

9. An apparatus comprising:
a responding unit to be located within a consumer-side venue, wherein the consumer-side venue receives electric power via an electricity meter that is located externally to the consumer-side venue;
wherein the responding unit is to receive from said electricity meter, via a wired electric cable, a cable-switching detection challenge message, wherein said cable-switching detection challenge message is transmitted via said wired electric cable in a direction that is towards said consumer-side venue; and to transmit to said electricity meter via said wired electric cable a cable-switching detection response message, wherein said cable-switching detection response message is transmitted via said wired electric cable in a direction that is outgoing from said consumer-side venue;
wherein evaluation of said cable-switching detection challenge message and said cable-switching detection response message enables detection of cable switching between said electricity meter and said consumer-side venue.

10. The apparatus of claim 9,
wherein said cable-switching detection response message authenticates said responding unit to said electricity meter based on a shared secret that is exclusively known to said responding unit and said electricity meter.

11. The apparatus of claim 9,
wherein said responding unit is part of an electric panel that is to be installed within said consumer-side venue.

12. The apparatus of claim 9,
wherein said responding unit is part of a wall-based electric socket that is to be installed within said consumer-side venue.

13. The apparatus of claim 9,
wherein said responding unit is to be part of an in-wall electrical wiring that runs within a wall of said consumer-side venue.

14. The apparatus of claim 9,
wherein said cable-switching detection response message authenticates said responding unit to said electricity meter based on a shared secret that is unknown to said electricity meter and is exclusively known to said responding unit and to a power-distributing device located upstream from said electricity meter.

15. The apparatus of claim 9,
wherein said cable-switching detection response message is constructed in said apparatus using a cryptographic private key, which corresponds to a cryptographic public key that was used by the electric meter to construct said cable-switching detection challenge message.

16. A method comprising:
sending a cable-switching detection challenge message from an electricity meter located externally to a consumer-side venue, towards a responding unit located within said consumer-side venue, via a wired electric cable that provides electric power from said electric meter to said consumer-side venue; wherein said cable-switching detection challenge message is transmitted via said wired electric cable in a direction that is towards said consumer-side venue;
receiving a cable-switching detection response message from said responding unit that is located within said consumer-side venue, wherein said cable-switching detection response message is transmitted via said wired electric cable in a direction that is outgoing from said consumer-side venue;
based on said cable-switching detection response message, determining whether said electricity meter or associated electric wire have been tampered with;
wherein evaluation of said cable-switching detection challenge message and said cable-switching detection response message enables detection of cable switching between said electricity meter and said consumer-side venue.

17. The method of claim 16, comprising:
if said cable-switching detection response message does not match a pre-defined shared secret that is known only to said electric meter and to said responding unit, then determining that said electricity meter or associated electric wires have been tampered with.

18. The method of claim 16, comprising:
if no cable-switching detection response message is received from said responding unit within a pre-defined time period of said sending, then determining that said electricity meter or associated electric wires have been tampered with.

19. The method of claim 16, comprising:
storing information indicating time-lengths that elapsed from sending cable-switching detection challenge messages to receiving respective cable-switching detection response messages;
determining that a particular time-length that elapsed between a particular sending operation and a particular respective receiving operation, is abnormal relative to other stored time-lengths;
based on said determining, generating a notification of possible malfunction of said electricity meter or associated electric wires.

20. The method of claim 16, comprising:
storing information indicating time-lengths that elapsed from sending cable-switching detection challenge messages to receiving respective cable-switching detection response messages;
determining that a particular time-length that elapsed between a particular sending operation and a particular respective receiving operation, is different by at least N percent relative to an average of a group of stored time-lengths, wherein N is a pre-defined value;

based on said determining, generating a notification of possible malfunction of said electricity meter or associated electric wires.

\* \* \* \* \*